(12) United States Patent
Fecteau et al.

(10) Patent No.: US 7,803,326 B2
(45) Date of Patent: Sep. 28, 2010

(54) HYDROCARBON CONVERSION UNIT INCLUDING A REACTION ZONE RECEIVING TRANSFERRED CATALYST

(75) Inventors: David J. Fecteau, Dhahan (SA); Paul A. Sechrist, South Barrington, IL (US); Christopher Naunheimer, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 444 days.

(21) Appl. No.: 11/832,008

(22) Filed: Aug. 1, 2007

(65) Prior Publication Data

US 2009/0035198 A1 Feb. 5, 2009

(51) Int. Cl.
*F27B 15/08* (2006.01)
*B01J 8/08* (2006.01)
*B01J 23/90* (2006.01)
*C10G 35/10* (2006.01)

(52) U.S. Cl. .................. 422/145; 422/216; 422/219; 422/223; 208/173; 208/174; 208/175

(58) Field of Classification Search ................ 422/216, 422/219, 223, 145; 208/173–175
See application file for complete search history.

(56) References Cited

U.S. PATENT DOCUMENTS

| 2,758,063 | A | 8/1956 | MacLaren et al. |
| 3,547,809 | A | 12/1970 | Ehrlich et al. |

(Continued)

FOREIGN PATENT DOCUMENTS

EP 0289991 11/1988

(Continued)

OTHER PUBLICATIONS

Cha et al., New Flexible Design For IFP High Severity Reforming Technology, May 1973, pp. 138-145, Publisher: Proceedings 38th Midyear Meeting of American Petroleum Institute's Division of Refining.

(Continued)

*Primary Examiner*—Walter D Griffin
*Assistant Examiner*—Lessanework Seifu
(74) *Attorney, Agent, or Firm*—Maryann Maas

(57) ABSTRACT

One exemplary embodiment can include an apparatus for transferring catalyst from a regeneration zone to a reaction zone in a hydrocarbon conversion unit. The hydrocarbon conversion unit can include a transfer vessel, and first, second, and third lines. The transfer vessel can transfer regenerated catalyst from the regeneration zone at a first pressure to the reaction zone at a second pressure where the second pressure is greater than the first pressure. Generally, the first line communicates the catalyst to the transfer vessel and is coupled to a first valve to allow catalyst into the transfer vessel and the second line communicates the catalyst from the transfer vessel and is coupled to a second valve to allow catalyst out of the transfer vessel. The third line for allowing the passage of gas therethrough may be at a pressure higher than the first pressure having a first portion communicating with the transfer vessel and having a second portion coupled to third and fourth valves. Each of the third and fourth valves can have a first position that is open and a second position that is closed, which may correspond, respectively, to the opening and closing of the first and second valves to allow gas to pass therethrough.

6 Claims, 4 Drawing Sheets

U.S. PATENT DOCUMENTS

| | | |
|---|---|---|
| 3,647,680 A | 3/1972 | Greenwood et al. |
| 3,652,231 A | 3/1972 | Greenwood et al. |
| 3,658,691 A | 4/1972 | Keith et al. |
| 3,692,496 A | 9/1972 | Greenwood et al. |
| 3,725,248 A | 4/1973 | Greenwood et al. |
| 3,725,249 A | 4/1973 | Vesely et al. |
| 3,825,116 A | 7/1974 | Greenwood |
| 3,838,038 A | 9/1974 | Greenwood et al. |
| 3,839,196 A | 10/1974 | Plackmann et al. |
| 3,839,197 A | 10/1974 | Greenwood et al. |
| 3,854,887 A | 12/1974 | Heinze et al. |
| 3,864,240 A | 2/1975 | Stone |
| 3,896,026 A | 7/1975 | MacLean et al. |
| 3,992,465 A | 11/1976 | Juguin et al. |
| 4,048,057 A | 9/1977 | Murphy |
| 4,133,743 A | 1/1979 | Boret et al. |
| 4,167,473 A | 9/1979 | Sikonia |
| 4,167,474 A | 9/1979 | Sikonia |
| 4,172,027 A | 10/1979 | Ham et al. |
| 4,210,519 A | 7/1980 | Boret et al. |
| 4,218,338 A | 8/1980 | Huin et al. |
| 4,233,268 A | 11/1980 | Boret et al. |
| 4,341,740 A | 7/1982 | Greenwood |
| 4,409,095 A | 10/1983 | Peters |
| 4,425,222 A | 1/1984 | Swan |
| 4,498,973 A | 2/1985 | Sikonia et al. |
| 4,576,712 A | 3/1986 | Greenwood |
| 4,578,370 A | 3/1986 | Greenwood |
| 4,615,792 A | 10/1986 | Greenwood |
| 4,644,089 A | 2/1987 | Lee |
| 4,720,473 A | 1/1988 | Welch et al. |
| 4,737,262 A | 4/1988 | Franck et al. |
| 4,737,269 A | 4/1988 | Bischoff |
| 4,744,887 A | 5/1988 | Van Driesen et al. |
| 4,835,129 A | 5/1989 | Travers et al. |
| 4,872,969 A | 10/1989 | Sechrist |
| 4,981,575 A | 1/1991 | De Bonneville |
| 5,034,117 A | 7/1991 | De Bonneville et al. |
| 5,155,075 A | 10/1992 | Innes et al. |
| 5,190,638 A | 3/1993 | Swan, III et al. |
| 5,196,110 A | 3/1993 | Swart et al. |
| 5,209,840 A | 5/1993 | Sherwood, Jr. et al. |
| 5,211,838 A | 5/1993 | Staubs, David W. et al. |
| 5,221,463 A | 6/1993 | Kamienski et al. |
| 5,277,880 A | 1/1994 | Sechrist et al. |
| 5,338,440 A | 8/1994 | Sechrist et al. |
| 5,354,451 A | 10/1994 | Goldstein et al. |
| 5,417,843 A | 5/1995 | Swart et al. |
| 5,824,619 A | 10/1998 | Sechrist et al. |
| 6,034,018 A | 3/2000 | Sechrist et al. |
| 6,395,664 B1 | 5/2002 | Boehner et al. |
| 6,458,266 B1 | 10/2002 | Lin et al. |
| 6,472,577 B1 | 10/2002 | Zimmermann et al. |
| 6,777,585 B2 | 8/2004 | Van Egmond |
| 6,881,391 B1 | 4/2005 | Sechrist |
| 6,884,400 B1 | 4/2005 | Austin et al. |
| 6,945,409 B2 | 9/2005 | Poussin |
| 2002/0164278 A1 | 11/2002 | Vetter et al. |
| 2003/0178347 A1 | 9/2003 | Poussin |
| 2003/0192811 A1 * | 10/2003 | Thompson et al. ...... 208/208 R |
| 2004/0178119 A1 | 9/2004 | Sanchez et al. |
| 2004/0232083 A1 | 11/2004 | Van Egmond |
| 2005/0067326 A1 | 3/2005 | Vaughn et al. |

FOREIGN PATENT DOCUMENTS

| | | |
|---|---|---|
| EP | 0312344 | 4/1989 |
| EP | 0366525 | 5/1990 |
| EP | 0439388 | 7/1991 |
| FR | 2.160.269 | 6/1973 |
| FR | 2381096 | 9/1978 |
| WO | WO-94/02246 | 2/1994 |
| WO | WO-03/000399 | 1/2003 |
| WO | WO-2005/026294 | 3/2005 |

OTHER PUBLICATIONS

Smithwick et al., N2 Sweep Speeds Reformer Start-up After Regeneration, Nov. 25, 1985, pp. 104-105, vol. 83, No. 47, Publisher: Oil and Gas Journal.

* cited by examiner

HYDROCARBON CONVERSION UNIT INCLUDING A REACTION ZONE RECEIVING TRANSFERRED CATALYST

CROSS-REFERENCE TO RELATED APPLICATION

This application relates to METHOD OF TRANSFERRING PARTICLES FROM ONE PRESSURE ZONE TO ANOTHER PRESSURE ZONE, filed Aug. 1, 2007, and assigned Ser. No. 11/832,059 which is hereby incorporated by reference in its entirety.

FIELD OF THE INVENTION

The field of this invention generally relates to a hydrocarbon conversion unit including a reaction zone receiving transferred catalyst.

BACKGROUND OF THE INVENTION

There are many chemical processes where solid particulate matter, such as catalyst, and a hydrocarbon gas are contacted. Frequently, chemical reactions and physical phenomena occur for a predetermined period of time in a reaction zone, contained in, e.g., a moving or fixed bed reactor. Often, the gas/solid contacting is in a continuous or semi-continuous manner instead of a batch operation. In such an instance, catalyst particles may be introduced and withdrawn from the reactor, which can be at a higher pressure than the source of the catalyst particles, such as a regenerator.

Hydrocarbon conversion units can include a reactor with one or more moving bed reaction zones used in conjunction with a regenerator. The reactor can include several reactor zones and can be structured in the form of a stack, or be split into sections to reduce the overall height. Typically, the regenerator with an atmosphere containing oxygen operates at a lower pressure than the reactor with an atmosphere containing hydrogen. Once the catalyst is transferred from the lower pressure to the higher pressure, a lift may be used to transfer the regenerated catalyst to the reactor. After the catalyst is spent, another lift can be utilized to transfer the catalyst from the reactor to the regenerator. Generally, the separation of the atmospheres of the reactor and regenerator is wanted to prevent undesirable side reactions.

Introducing catalyst particles into a high-pressure reactor from a regenerator can pose difficulties. Equipment, such as screw conveyors or star valves, can degrade solid catalyst into smaller particles, which in turn may create wear and tear on processing equipment. Another option may be a transfer vessel having double block-and-bleed ball valves to control the entry of regenerated catalyst into and out of the vessel. The catalyst entering the vessel can be purged with nitrogen to remove oxygen and pressured with hydrogen up to the reactor pressure before transfer into the reactor. After catalyst exits the vessel, the vessel can be purged with nitrogen to remove the hydrogen before filling again with catalyst. Such a transfer vessel can separate the hydrogen atmosphere of the reactor from the oxygen atmosphere of the regenerator. However, this vessel can require that the block-and-bleed ball valves be maintained in excellent working condition. A leak in either of the block-and-bleed ball valves may result in gas leakage impeding the transfer of the catalyst through the transfer vessel.

Another transfer vessel can be a valveless lock hopper that can include three sections. Generally, catalyst is received in a top section where it is intermittently transferred to a middle section. The middle section can allow catalyst to flow in before being transferred to the bottom section. A standpipe's diameter may be sized in the middle section so that gas flowing upwards can stop catalyst flow while allowing catalyst flow through another section of the pipe. This may be achieved by the alternate opening and closing of equalizing valves positioned on a pipe communicating with all three sections and in a parallel relationship with the catalyst flow. As an example, when the equalizing valve between the top and middle section is open, the valve between the middle and bottom section is closed so gas flowing up the lower standpipe will prevent catalyst flow from the middle zone through the lower standpipe yet allow catalyst flow into the middle zone through the upper standpipe. Repeated cycling of the equalizing valves will allow a controlled flow of catalyst from the low pressure of the regenerator to the high pressure of the reactor.

However, it may be desirable to reduce the height of a hydrocarbon conversion unit to reduce the cost of construction and maintenance. Particularly, tall structures can require additional expense in fortifying the foundations to withstand the high heights of construction, and subsequent impact of harsh weather events. Moreover, once these units are constructed, they can exceed 60-90 meter (200-300 feet) in height and incur greater maintenance costs compared to units of lesser height.

Often, a regenerator is built in parallel to the reactor. The regenerator can include other vessels, such as an elutriation vessel and a valveless lock hopper. Even if the reactor stacks are split to reduce their height, the regenerator is typically a single vessel and can still have a substantial height to provide sufficient capacity to regenerate the catalyst used in one or more of the reactors. Moreover, often other vessels, such as the elutriation and transfer vessels, are stacked with the regenerator. As such, the overall height of the three vessels can be quite substantial, even if the reactors are split.

When the differential pressure between the regenerator and the reactor is large, generally the standpipes in the valveless lock hopper are longer. The longer standpipes can increase the overall height of the valveless lock hopper, and thus, the entire unit. In such an instance, it would be desirable to reduce the overall regeneration structure height, particularly in cases where the reactor is split into sections. It would also be desirable to reduce the height of the regeneration structure to be that of the reactor. Moreover, sometimes operating at a greater pressure differential between a regenerator base and lift is desired to provide more tolerance for process upsets. However, operating at a greater pressure differential can result in longer lines, and hence may further increase the height of a unit.

Consequently, there is desire to reduce the overall height of a hydrocarbon conversion unit, particularly the regeneration structure. Moreover, there is desire to utilize a transfer apparatus that has a lesser elevation compared to other transfer apparatuses.

BRIEF SUMMARY OF THE INVENTION

One exemplary embodiment can include an apparatus for transferring catalyst from a regeneration zone to a reaction zone in a hydrocarbon conversion unit. The hydrocarbon conversion unit can include a transfer vessel, and first, second, and third lines. The transfer vessel can transfer regenerated catalyst from the regeneration zone at a first pressure to the reaction zone at a second pressure where the second pressure is greater than the first pressure. Generally, the first line communicates the catalyst to the transfer vessel and is coupled to a first valve to allow catalyst into the transfer vessel and the second line communicates the catalyst from the transfer vessel and is coupled to a second valve to allow catalyst out of the transfer vessel. Generally, the third line allows the passage of gas therethrough where the gas may be at a pressure higher than the first pressure and has a first portion communicating with the transfer vessel and a second portion coupled to third and fourth valves. Each of the third and fourth valves can have a first position that is open and a second position that is closed, which may correspond, respectively, to the opening and closing of the first and second valves to allow gas to pass therethrough.

Another exemplary embodiment can include a hydrocarbon conversion unit. The hydrocarbon conversion unit can include an apparatus for allowing the passage of catalyst from a lower pressure to a higher pressure, and a reaction zone. Generally, the reaction zone receives regenerated catalyst from the apparatus by gravity-assisted transfer.

A further embodiment may include a hydrocarbon conversion unit. The hydrocarbon conversion unit can include first, second, and third sets. The first set can have a plurality of vessels, including a regeneration vessel. The second set can have a plurality of vessels, including an apparatus for transferring regenerated catalyst from a first pressure to a second pressure. Generally, the second pressure is greater than the first pressure, and the apparatus receives regenerated catalyst by gravity-assisted transfer. The third set may have a plurality of vessels, including at least one reaction vessel. Typically, the first, second, and third sets are in separate arrangements allowing one or more vessels within a set to receive catalyst by gravity-assisted transfer and catalyst may be transferred between sets.

Therefore, the hydrocarbon conversion unit can provide several advantages. Particularly, the hydrocarbon conversion unit can allow utilization of an apparatus that can include several vessels for transferring regenerated catalyst from a lower pressure to a higher pressure. Moreover, using a plurality of smaller vessels instead of one large vessel can reduce catalyst inventory and maintenance costs. Generally, such a structure is more compact and helps reduce the overall height of the hydrocarbon conversion unit. Furthermore, it can provide additional flexibility in that the apparatus can be utilized in a substantially vertical stack with the regenerator vessels or with the reaction vessel or vessels. In addition, the separate vessels of the transfer apparatus can reduce the number of vessels being utilized with a reactor system. As such, utilizing the vessels in a common stack can reduce the cost and complexity of the unit. In addition, the utilization of a parallel equalization line permits the use of valves that have gas leakage. This feature can permit the operation of valves under a variety of conditions and permits their use despite having substantial leakages, which in other configurations would require shutting down the unit to replace them. This feature can help reduce the maintenance cost of the valves and extend operation of the transfer apparatus between maintenance repairs.

DEFINITIONS

Figure 1:
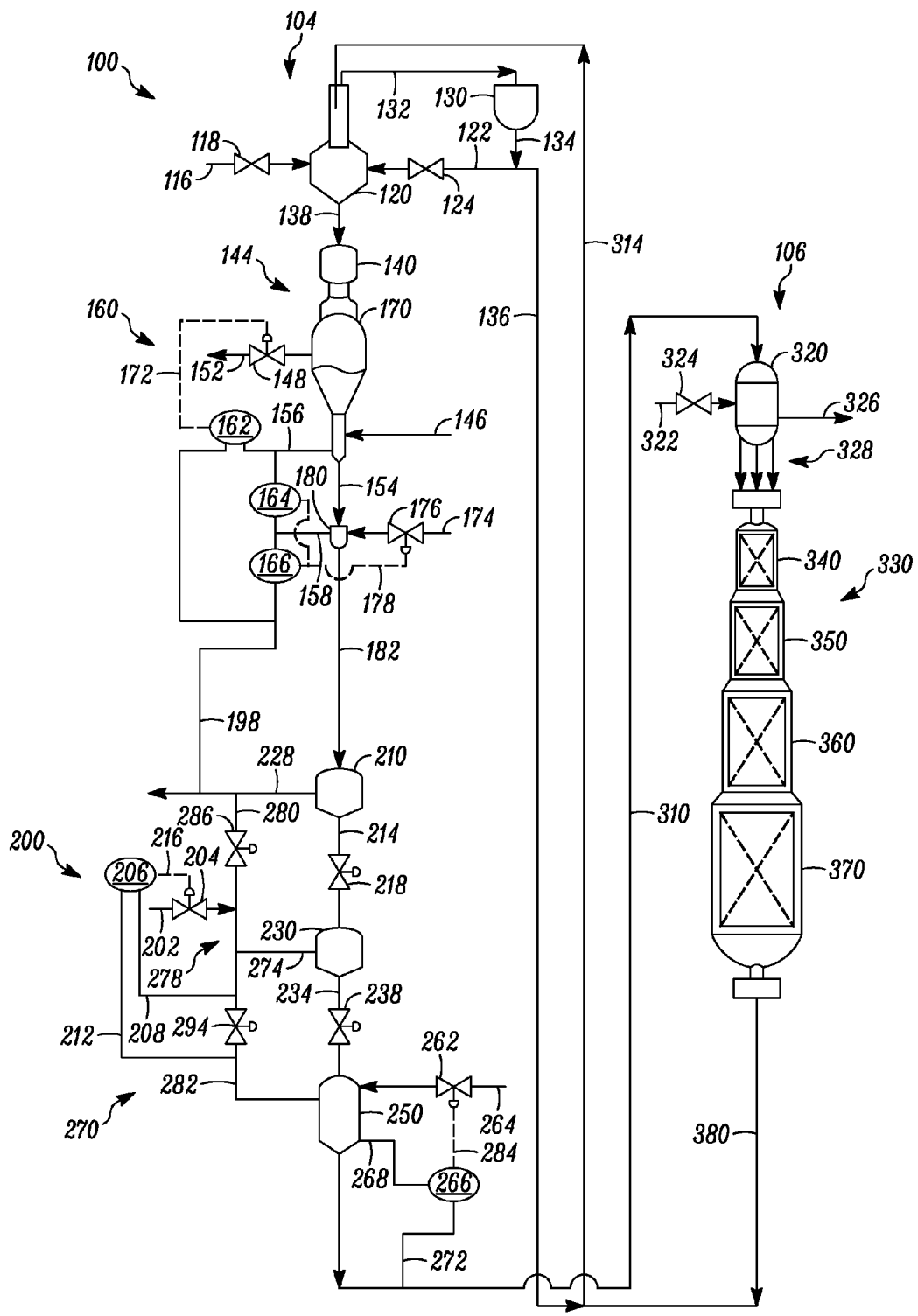
FIG. 1 is a schematic depiction of an exemplary hydrocarbon conversion unit.

As used herein, "gravity-assisted transfer" can mean vessels aligned sufficiently vertically to allow catalyst to flow, at least in part, by gravity from at least one vessel at a higher elevation to at least one vessel at a lower elevation.

As used herein, the term "parallel" can mean a line or a vessel positioned to communicate, directly or indirectly, with another line or vessel at a plurality of points. A parallel line or vessel need not be physically parallel to another line or vessel.

As used herein, the term "zone" can refer to an area including one or more equipment items and/or one or more sub-zones. Additionally, an equipment item, such as a reactor or vessel, can further include one or more zones or sub-zones.

As used herein, the term "set" can mean a plurality of vessels arranged to permit gravity-assisted transfer of particles, such as catalyst, from one vessel to another vessel. Such a set can be referred to as a separate arrangement of vessels. Moreover, the terms "first set", "second set", "third set", can refer to any combination of vessels, e.g., reactor, regenerator, or apparatus, which passes catalyst from one vessel to another vessel by gravity-assisted transfer.

As used herein, the term "regenerated", such as regenerated catalyst, can refer to catalyst that has passed through a regenerator, although additional regeneration processes may still be conducted, such as reduction.

DETAILED DESCRIPTION OF THE INVENTION

The embodiments disclosed hereinafter can be used in a multitude of units to transfer catalyst between any two zones which contain fluids that are preferably prevented from communicating. One such application that may require inhibited communication between the fluids of two zones is the transfer of catalyst between a hydrogen-containing reaction zone and an oxygen-containing regeneration zone. Typically these zones are at different pressures, usually with the reaction zone at a higher pressure than the regeneration zone. Generally, inhibiting communication is greatly preferred because the fluids of the two zones can react with each other creating undesirable side reactions. Exemplary reaction and regeneration zones are disclosed in, e.g., U.S. Pat. No. 6,881,391 B1 (Sechrist) and U.S. Pat. No. 6,034,018 (Sechrist et al.)

Such systems having a hydrogen-containing reaction zone and an oxygen-containing regeneration zone may be employed in a wide variety of hydrocarbon conversion reactions including catalytic reforming, alkylation, hydrorefining, hydrocracking, dehydrogenation, hydrogenation, hydrotreating, isomerization, dehydroisomerization, dehydrocyclization, and steam reforming. Generally, the catalysts in these processes are used in one or more hydrocarbon-containing reaction zones in an atmosphere containing hydrogen. Over time, the catalyst in the reaction zone(s) can become deactivated because of the accumulation of coke deposits. Regeneration of the catalyst to remove the coke deposits can help restore the activity of the catalyst. Generally, coke deposits are removed from the catalyst by contacting the catalyst with an oxygen-containing gas to combust and remove the coke in a regeneration zone. Many of these processes use a reaction zone and a regeneration zone in side-by-side relation to each other. In these systems, the catalyst is continuously or semi-continuously removed from the reaction zone and transferred to the regeneration zone for coke removal. Following coke removal, the catalyst can be removed from the regeneration zone and transferred back to the reaction zone. Therefore, there is a requirement to transfer the catalyst back-and-forth between a hydrogen-containing zone and an oxygen-containing zone without communication or cross-mixing of the atmospheres of the two zones.

One widely practiced hydrocarbon conversion process is catalytic reforming. Therefore the discussion hereinafter will be in reference to this process, although the embodiments discussed herein are applicable to other processes.

Typically in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 80° C. (about 180° F.) and an end boiling point of about 205° C. (about 400° F.). The reactor inlet temperatures can range from about 450- about 560° C. (about 840-about 1040° F.). The catalytic reforming process can be particularly applicable to the treatment of straight run gasolines comprised of relatively large concentrations of naphthenic and substantially straight chain paraffinic hydrocarbons, which can be subject to aromatization through dehydrogenation and/or cyclization reactions.

Reforming may be defined as the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,409,095 (Peters).

A catalytic reforming reaction is normally effected in the presence of catalyst particles comprised of one or more Group VIII noble metals (e.g., platinum, iridium, rhodium, and palladium) and a halogen combined with a porous carrier, such as an alumina. The particles are usually spheroidal and have a diameter of from about 1/16th to about 1/8th inch (about 1.6-about 3.2 mm), although they may be as large as about 1/4th inch (about 6.4 mm). Exemplary catalysts are disclosed in U.S. Pat. No. 6,034,018 (Sechrist et al.). During the course of a reforming reaction, catalyst particles may become deactivated as a result of mechanisms such as the deposition of coke on the particles; that is, after a period of time in use, the ability of catalyst particles to promote reforming reactions can decrease to the point that the catalyst is no longer useful. The catalyst must be reconditioned, or regenerated, before it can be reused in a reforming process.

In one preferred form, the reformer will employ a moving bed reaction zone and regeneration zone. Generally, fresh catalyst particles are fed to a reaction zone, which may be comprised of several subzones, and the particles flow through the zone by gravity-assisted transfer. Catalyst may be withdrawn from the bottom of the reaction zone and transported to a regeneration zone where a multi-step regeneration process can be used to remove the coke deposits and recondition the catalyst to restore its reaction promoting ability. Generally, the regeneration zone contains oxygen and generally operates at about 370-about 538° C. (about 700-about 1000° F.). Typically, catalyst flows by gravity-assisted transfer through the various regeneration steps and then is withdrawn from the regeneration zone at temperatures usually no greater than about 200° C. (about 400° F.) and furnished to the reaction zone. Catalyst that is withdrawn from the regeneration zone can be termed regenerated catalyst. Movement of catalyst through the zones is often referred to as continuous though, in practice, it may be semi-continuous. Semi-continuous movement can mean the repeated transfer of relatively small amounts of catalyst at closely spaced points in time. As an example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system can have the advantage of maintaining production while the catalyst is removed or replaced.

Before referencing the drawing figures, a hydrocarbon conversion unit can include a reaction vessel and a regeneration vessel, and lines and equipment associated with these vessels as disclosed in, e.g., U.S. Pat. No. 6,881,391 B1 (Sechrist) and U.S. Pat. No. 6,034,018 (Sechrist et al.). So, the following units are described schematically in the context of the present embodiments and generally not drawn to scale. The hydrocarbon flow through the reaction vessel and accompanying equipment, e.g. heat exchangers and furnaces, known to those of skill in the art are omitted while the discussion below focuses on the flow of catalyst to and from the reaction zone and regeneration zone.

Referring to FIG. 1, an exemplary hydrocarbon conversion zone 100 is depicted. The exemplary hydrocarbon conversion unit 100 can include a first set 104 of substantially vertically-aligned vessels and a second set 106 of substantially vertically-aligned vessels. Within each set 104 or 106, generally the vessels are aligned so that the catalyst can be transferred from one vessel to the next by gravity-assisted transfer. As such, the vessels do not have to be aligned vertically, but only have to be aligned sufficiently vertically, such as deviating less than about 40 degrees from vertical, to permit gravity-assisted transfer. Although the vessels are being described as substantially vertically, it should be understood that the vessels may be skewed to a certain degree but still permit at least a portion of the catalyst to be transferred, at least in part, by a gravity-assisted transfer.

Preferably, the vessels are aligned substantially vertically. Generally, a first lift 310 and a second lift 314 transfer catalyst from the first set 104 to the second set 106 and vice-versa. The upward transportation of catalyst can be obtained by various auger-type conveyors, buckets, or other mechanical devices. Preferably, the catalyst falls into a lift pot or lift engager and is transported by a fluidizing gas that carries the catalyst upward through a conduit. The gas stream may be hydrogen, nitrogen, air, or methane. An exemplary fluid lift is disclosed in U.S. Pat. No. 5,338,440 (Sechrist et al.).

The first set 104 can include an elutriation vessel 120, a pressure-reduction vessel 140, a regeneration zone 160, a nitrogen-containing vessel 180, and an apparatus 200. Generally, the elutriation vessel 120 receives regenerated catalyst from the lift 314. The elutriation vessel 120 can be associated with lines 116, 122, 132 and 138, valves 118 and 124, and a dust collector 130. Typically, regenerated catalyst is received within the vessel 120 and nitrogen is supplied through a line 116. Dust and catalyst particles can be entrained in the nitrogen gas and exit through a line 132. The dust and catalyst particles (i.e. whole pills) may be separated from the gas by passing the combined stream through a dust collector 130. The whole pills can be screened and returned to the process. The gas may be recycled to the elutriation vessel 120 through the line 122 or to the lift 314. An exemplary elutriation device is disclosed in U.S. Pat. No. 4,615,772 (Greenwood).

The pressure-reduction vessel 140 can receive the regenerated catalyst from the elutriation vessel 120 via a line 138. Generally, the catalyst passes through a pair of lines or legs 144 to the regeneration vessel 170.

The regeneration zone 160 can include a regeneration vessel or regenerator 170, which in turn can include a combustion zone, a halogenation zone, a drying zone, and a cooling zone. Exemplary regeneration vessels are disclosed in U.S. Pat. No. 5,824,619 (Sechrist et al.). The spent catalyst may enter at the top of the regeneration vessel 170 via legs 144 and exit via a line 154. Generally, the regeneration vessel 170 has a combustion zone to burn coke deposits and a halogenation zone to redisperse metal on the catalyst by adding a halogen, typically a chloride, agent. The regeneration vessel 170 can be supplied with air via a line 146 and have the pressure controlled within the vessel via a control valve 148 on a vent line 152, as hereinafter described. The regeneration vessel 170 can operate at a pressure ranging generally from about 0-about 6900 kPa(g) (about 0-about 1000 psig), preferably from about 240-about 410 kPa(g) (about 35-about 60 psig), more preferably about 228-about 262 kPa(g) (about 33.0-38.0 psig), about 231-about 265 kPa(g) (about 33.5-about 38.5 psig), or about 234-about 255 kPa(g) (about 34.0-about 37.0 psig), and optimally about 240 kPa(g) (about 35 psig).

Afterwards, the catalyst can enter the nitrogen-containing vessel 180 from the line 154. The nitrogen-containing vessel 180 can be supplied nitrogen via a line 174 passing through a control valve 176. The nitrogen can purge the vessel 180 of any oxygen passed from the regeneration vessel 170. The pressure can be controlled so the pressure in the vessel 180 is higher than the pressure at the bottom of the regeneration vessel 170 and higher than the apparatus 200. The nitrogen purge may help prevent the oxygen in the regeneration vessel 170 from mixing with the hydrogen at the top of the apparatus 200, while simultaneously not interfering with the flow of catalyst via gravity-assisted transfer.

The apparatus 200 can receive the regenerated catalyst from the line 182 and include a storage vessel 210, a transfer vessel 230, and a second storage vessel such as a receptacle vessel 250. Generally, a line or a first line 214 communicates with the vessels 210 and 230 and a line or a second line 234 communicates with the vessels 230 and 250. In addition, a line or a third line 270 can communicate with the vessels 210, 230, and 250. The third line can include a first portion 274 communicating with the transfer vessel 230 and intersecting a second portion 278, which in turn can have an end 280 and another end 282. Generally, the end 280 terminates into a vent line 228 from the storage vessel 210, and the another end 282 communicates with the receptacle vessel 250. The vent line 228 can serve as an outlet usually at a fixed pressure and recycle gas for use within the hydrocarbon conversion unit 100 or dispose the gas to, e.g., a fuel gas header. Typically, control valves 218 and 238 are coupled to, respectively, the lines 214 and 234 and control valves 286 and 294 are coupled to the second portion 278 on opposing sides of the junction with the first portion 274. Although only one valve 218 or 238 is depicted, it should be understood that two or more valves can be utilized for each valve 218 and 238 to facilitate, e.g., maintenance of the transfer vessel 230 by aiding its isolation. Furthermore, hydrogen can be supplied though the line 202 to the second portion 278 and the line 264 to the receptacle vessel 250. The control valves 204 and 262 coupled to, respectively, the lines 202 and 264 will be discussed in more detail hereinafter. Generally, catalyst passes via gravity-assisted transfer through the vessels 210, 230, and 250 and enters the lift 310 to the second set 106.

The second set 106 can include a reducing vessel 320, and at least one reaction vessel or reactor 330. The reducing vessel 320 receives the regenerated catalyst from the lift 310. To reduce the catalyst before entering the reactor 330, hydrogen can be supplied through a line 322 and pass through a valve 324. The excess hydrogen can be vented via a line 326. The catalyst can then pass through the lines 328 into the reactor 330.

The reactor 330 can include a plurality of reforming zones, such as a first reaction zone 340, a second reaction zone 350, a third reaction zone 360, and a fourth reaction zone 370. Although these zones 340, 350, 360, and 370 are depicted as housed in a single reactor, it should be understood that the zones 340, 350, 360, and 370 can be housed in a plurality of separate reactors. Although four reaction zones are depicted, it should be understood that any number of reaction zones can be utilized. Typically, the conversion zones are arranged in a stacked reactor arrangement or in side-by-side reactors. Moving bed reactors are known to those of skill in the art and exemplary moving bed reactors are disclosed in U.S. Pat. No. 4,409,095 (Peters). The zones 340, 350, 360 and 370 can operate at a pressure of about 0-about 6,900 kPa(g) (about 0-about 1,000 psig), desirably about 620-about 1030 kPa(g) (about 90-about 150 psig). The catalyst can exit the reactor 330 through a line 380 and into the lift 314 to the first set 104 to be regenerated.

The first set 104 of the hydrocarbon conversion unit 100 can be provided with several differential pressure controllers. Particularly, differential pressure controllers 162, 164, 166, 206 and 266 may be provided. The controller 162 can have a pressure tap 156 at the base of the regeneration vessel 170 and a pressure tap 198 on the vent line 228, or in an alternative embodiment, on the storage vessel 210. The controller 162 may send a signal 172 to the control valve 148 to regulate the gases exiting the regeneration vessel 170 through the line 152. As an example, the differential pressure controller 162 can be set to maintain the pressure in the base of the regeneration vessel 170 at about 255 kPa(g) (about 37.0 psig) with a differential pressure of about 0 kPa (about 0 psi) between the base of the regeneration vessel 170 and the vent line 228.

The differential pressure controllers 164 and 166 can control the pressure in the nitrogen-containing vessel 180 to exceed the pressure in the bottom of the regeneration vessel 170 and the top of the storage vessel 210. The differential pressure controllers 164 and 166 may share a pressure tap 158 communicating with the nitrogen-containing vessel 180, the differential pressure controller 164 can share the pressure tap 156 with the differential pressure controller 162, and the differential pressure controller 166 can share the pressure tap 198 with the differential pressure controller 162. The differential pressure controllers 164 and 166 can send a signal 178 to the control valve 176 to control the nitrogen flow into the nitrogen-containing vessel 180.

As an example, if the pressure in the base of the regeneration vessel 170 is about 255 kPa(g) (about 37.0 psig), the pressure in the nitrogen-containing vessel 180 can be at about 257 kPa(g) (about 37.3 psig). Thus, the nitrogen-containing vessel 180 can be maintained at about 2 kPa (about 0.3 psi) above the base of the regeneration vessel 170 and the vent line 228 to desirably create a positive flow of nitrogen towards them.

Usually, the differential pressure controller 206 communicates with a pressure tap 208 that communicates with the end 282 on one side of the control valve 294 and communicates with a pressure tap 212 that also may communicate with the end 282 on an opposing side of the control valve 294. The controller 206 can measure the pressure of the transfer vessel 230 and the receptacle vessel 250 and can control the influx of hydrogen from the line 202 into the transfer vessel 230 by providing a signal 216 to the control valve 204. Adding hydrogen can hasten the equalization of pressure between the vessels 230 and 250 and allow the catalyst to pass from the transfer vessel 230 to the receptacle vessel 250. In some alternative embodiments, the controller 206 and the line 202 can be omitted and the vessels 230 and 250 can be allowed to arrive at equilibrium after the valves 238 and 294 are opened to subsequently permit the catalyst to drop by gravity-assisted transfer.

Similarly, the controller 266 may communicate with the receptacle vessel 250 with a pressure tap 268 and the base of the lift 310 via a pressure tap 272 to provide a signal 284 to the control valve 262 to provide hydrogen from the line 264 to the receptacle vessel 250. As an example, hydrogen can be provided to keep a pressure differential of 0 kPa (0 psi) with the receptacle vessel 250 and the lift 310 to facilitate the transfer of catalyst from the receptacle vessel 250 and the lift 310.

In operation, the spent catalyst can enter the first set from the lift 314 and be passed to the elutriation vessel 120 having nitrogen added through the line 116. The catalyst can exit the elutriation vessel 120 by passing through the line 138 and into the pressure-reduction vessel 140. Generally, the pressure-reduction vessel 140 has the same pressure as the regeneration vessel 170. As an example, the pressure in the pressure-reduction vessel 140 allows the pressure to be reduced from as high as about 620 kPa(g) (about 90 psig), which can be generally the same pressure as the reactor 330, to the pressure of the regenerator, such as about 240 kPa(g) (about 35 psig). Subsequently, the catalyst can pass through the legs 144 into the regeneration vessel 170 to be regenerated.

After exiting the regeneration vessel 170, the catalyst can pass to the nitrogen-containing vessel 180. The nitrogen-containing vessel 180 can provide an atmosphere of nitrogen at a slightly higher pressure, but not at a pressure sufficient to impede the flow of regenerated catalyst by gravity-assisted transfer.

The catalyst then can enter the apparatus 200, typically the storage vessel 210, via gravity-assisted transfer from the nitrogen-containing vessel 180 by the line 182. The regeneration vessel 170 typically operates in a continuous operation or a semi-continuous operation, while the apparatus 200 can transfer regenerated catalyst from a lower pressure to a higher pressure by a sequential transfer operation.

To transfer the catalyst from the storage vessel 210 to the transfer vessel 230, generally the valves 218 and 286 open and the control valves 238 and 294 close. Closing the control valves 238 and 294 can isolate the catalyst in the storage vessel 210 from the pressure of the reactor 330. As an example, the pressure in the storage vessel 210 can be at about 255 kPa(g) (about 37.0 psig) while the pressure initially in the transfer vessel 230 can be about as high as 620 kPa(g) (about 90 psig). Opening the control valves 218 and 286 may allow the pressure in the transfer vessel 230 to escape through the second portion 278 of the third line 270 to the vent line 228. Moreover, if the control valve 238 does not seal properly, gas from the receptacle vessel 250 can pass through the transfer vessel 230, through the first and second portions 274 and 278 to the vent line 228. Generally, this prevents gas from the higher pressure in the storage vessel 250 from flowing up the lines 234 and 214 to prevent the catalyst from flowing from the storage vessel 210 into the transfer vessel 230. Once the control valves 218 and 286 are opened, the catalyst can fall into the transfer vessel 230 from the storage vessel 210.

Afterwards, to pass the catalyst from the transfer vessel 230 to the receptacle vessel 250, the control valves 218 and 286 can be closed and the control valves 238 and 294 can be opened. Optionally, hydrogen can be added from the line 202 by opening the control valve 204 to equalize the pressure between the transfer vessel 230 and the receptacle vessel 250 to facilitate the transfer of catalyst via gravity-assisted transfer. If there are substantial leaks in the control valves 218 and 286 drawing gas upwards, the opening of the control valve 294 permits these gases to pass through the third line 270 and into the transfer vessel 230 to facilitate the equalization of pressure while not creating an adverse pressure gradient in the line 234 that would impede the transfer of catalyst via gravity-assisted transfer from the transfer vessel 230 to the receptacle vessel 250. In addition, the nitrogen pressure bubble in the vessel 180 can prevent the entry of the gases into the regeneration vessel 170. Rather, these gases can exit the vent line 228. Next, the catalyst from the receptacle vessel 250 can be released in constant increments into the fluid lift 310.

After the regenerated catalyst enters the lift 310, it can be passed to the reducing vessel 320. Generally, the catalyst enters the reducing vessel 320 and is exposed to hydrogen introduced from a line 322 and regulated with the valve 324. Afterwards, the regenerated catalyst can pass into the reactor 330 through the lines 328. Excess hydrogen can pass from the reducing vessel 320 through a line 326. The regenerated catalyst may enter the reactor 330 and be utilized for converting a hydrocarbon feed. Subsequently, the catalyst can pass from the reactor 330 to enter the line 380 and then the lift 314 to repeat the cycle.

The apparatus 200 can provide a reduction in the overall height of the unit by reducing the length of piping required to transfer the catalyst from the lower pressure regions associated with the regeneration vessel 170 to the higher pressure regions associated with the reactor 330. Particularly, utilizing three separate vessels in a transfer apparatus can reduce height, catalyst inventory, and maintenance costs as compared to a larger, single vessel.

Figure 2:
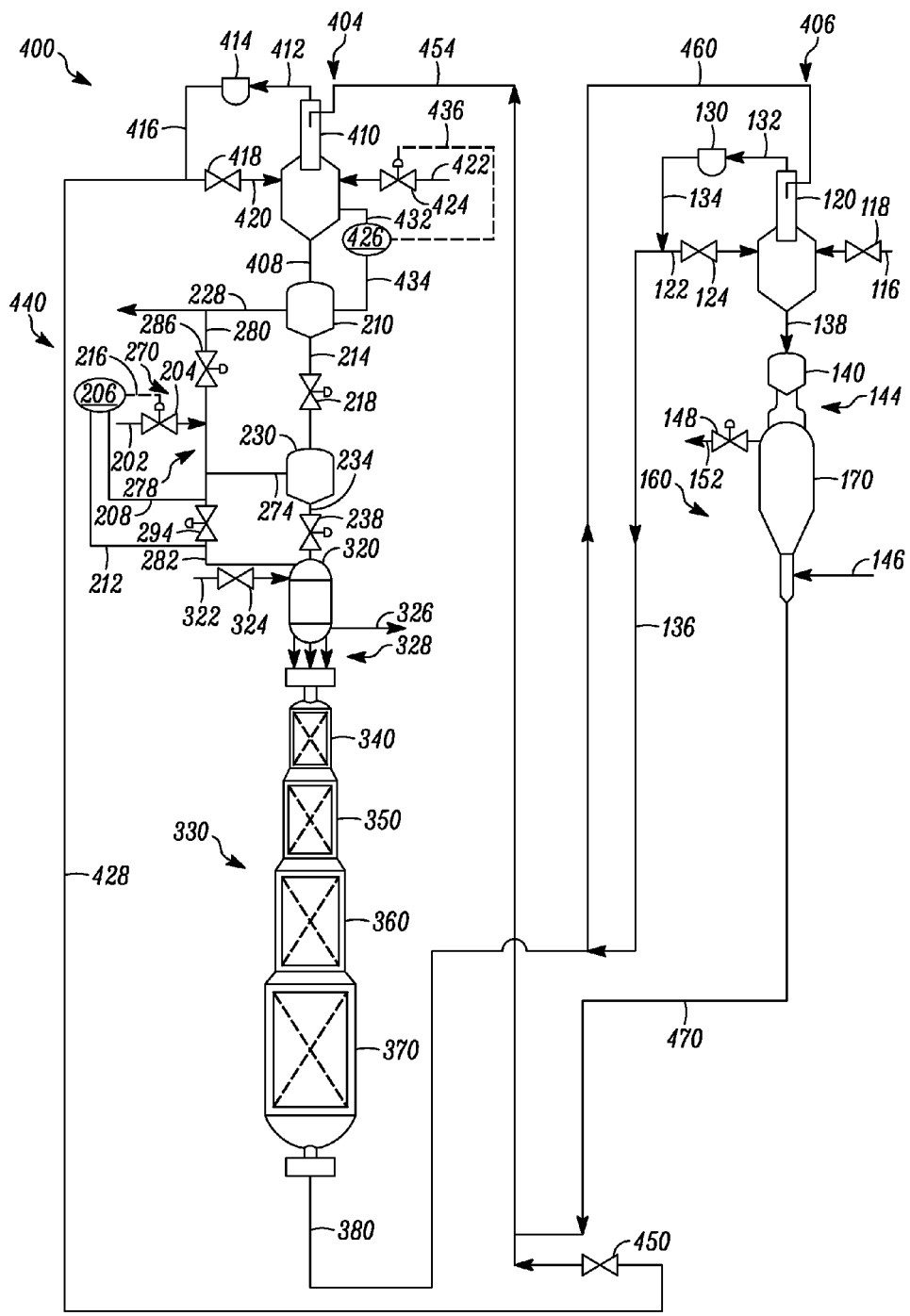
FIG. 2 is a schematic depiction of another exemplary hydrocarbon conversion unit.

Referring to FIG. 2, another embodiment of an exemplary hydrocarbon conversion unit 400 is depicted. In some instances, it is desirable to lower the height of the regeneration zone 160 as compared to the reactor 330. Often, the regeneration zone 160 can contain a single regeneration vessel 170 regenerating catalyst for multiple reactors. In such an instance, the regeneration vessel 170 may be the tallest vessel in the hydrocarbon conversion unit 400. Minimizing the number of vessels aligned substantially vertically with the regeneration vessel 170 can lower the overall height of the unit 400. In this exemplary unit 400, the apparatus 440 is provided above the reactor 330 to reduce the height of the elutriation vessel 120 and the regenerator 170. In addition, as discussed below, this arrangement can reduce the number of vessels and differential pressure controllers in the transfer apparatus.

The hydrocarbon conversion unit 400 can have a first set 404 of substantially vertically-aligned vessels and a second set 406 of substantially vertically-aligned vessels. The first set 404 can include a second elutriation vessel 410, an apparatus 440, the reducing vessel 320 and the at least one reaction vessel 330. The reducing vessel 320 and the at least one reaction vessel 330 have been described-above. The second set 406 can include an elutriation vessel 120, a pressure-reduction vessel 140, and a regeneration vessel 170, as described-above. Typically, the lifts 454 and 460 provide catalyst to, respectively, the first set 404 and the second set 406, and are similar to the lifts 310 and 314 described-above.

In this exemplary unit 400, two elutriation vessels 120 and 410 can be provided to remove dust and catalyst particles. Catalyst can degrade during, e.g., transfer between the sets 404 and 406 in the lifts 454 and 460. Such dust can negatively impact operations by plugging screens and other equipment thereby increasing operation and maintenance costs. Providing the second elutriation vessel 410 can remove dust and facilitate operations.

Generally, regenerated catalyst is received through a lift 454 and enters the elutriation vessel 410. The elutriation vessel 410 can be provided nitrogen through a line 422 that passes through a control valve 424, described in more detail hereinafter. Usually, the nitrogen removes dust and whole pills from the regenerated catalyst and can escape through a line 412 into a dust collector 414. In the dust collector 414, dust can be removed from the gas, and whole pills can be screened and returned to the process. The gas may then pass through a line 416. Part of the nitrogen can be recycled back to the elutriation vessel 410 through a line 420 by passing through a valve 418. Another part of the gas passing through the line 416 can travel through a line 428 to be supplied to the lift 454. Subsequently, the catalyst can pass through the elutriation vessel 410 to a storage vessel 210 and through a valve 218 via a line 214 into the transfer vessel 230. Usually, the apparatus 440 is substantially similar to the apparatus 200, and includes the storage vessel 210, the transfer vessel 230, and the first, second, and third lines 214, 234 and 270, as well as the differential pressure controller 206. The apparatus 440 can operate substantially similar as the apparatus 200, except the apparatus 440 does not include the receptacle vessel 250 and differential pressure controller 268. Rather, the catalyst passes by gravity-assisted transfer directly into the reducing vessel 320. Generally, the reducing vessel 320 receives the catalyst for subsequent transfer to the reactor 330. In this exemplary embodiment, the reducing vessel 320 may replace the receptacle vessel 250 and serve as a second storage vessel. Consequently, it can serve to receive the catalyst from the transfer vessel 230 before subsequent passage to the reactor 330.

The lifts 454 and 460 can contain nitrogen at least partially supplied from, respectively, the elutriation vessels 410 and 120. Thus, nitrogen is used to transfer the catalyst to and from the first set 404 and the second set 406.

Typically, the regeneration vessel 170 can operate at a pressure as described-above. An exemplary pressure is about 230 kPa(g) (about 33 psig)-about 260 kPa(g) (about 38 psig). Generally, the pressure differential can be about 14 kPa (about 2 psi) to prevent air from the regeneration vessel 170 from mixing with the hydrogen environment of the reactor 330. Consequently, this pressure differential is maintained between the bottom of the regeneration vessel 170 and the base of the lift 454 near the juncture with the line 470 to prevent mixing of these gasses. Usually, sufficient pressure is provided so a counter-current flow of nitrogen is created in the line 470 towards the regeneration vessel 170 from the base of the lift 454. Consistent with the exemplary pressure of the regeneration vessel 170, the pressure at the base of the lift 454 can be about 260 kPa(g) (about 37 psig)-about 280 kPa(g) (about 40 psig).

In addition, a pressure differential of about 14 kPa (about 2 psi) can be maintained between the elutriation vessel 410 and the storage vessel 210. Typically, this pressure differential is maintained by the pressure controller 426. The pressure controller 426 can communicate via pressure taps 432 and 434 with, respectively, the elutriation vessel 410 and the storage vessel 210 and provide a signal 436 to the control valve 424 that may regulate the supply of nitrogen to the elutriation vessel 410. Desirably, the pressure differential between the elutriation vessel 410 and the storage vessel 210 is about 14 kPa (about 2 psi). As an example, the elutriation vessel 410 can be at a pressure of about 260 kPa(g) (about 37 psig) and the storage vessel 210 can be at a pressure of about 240 kPa(g) (about 35 psig).

In operation, the path of the regenerated catalyst to the first set 404 can enter the elutriation vessel 410 via the lift 454. Afterwards, the catalyst can pass from the elutriation vessel 410 to the apparatus 440 by gravity-assisted transfer. The catalyst can pass from the storage vessel 210 to the transfer vessel 230 by closing control valves 238 and 294 and opening control valves 218 and 286, as described-above. Subsequently, the catalyst can be transferred from the transfer vessel 230 to the reducing vessel 320 by opening control valves 238 and 294 and closing control valves 218 and 286 and optionally providing hydrogen through the line 202. The catalyst can exit the reducing vessel 320 and enter the reactor 330. Next, the spent catalyst can exit the reactor 330 via the line 380 and enter the lift 460.

The spent catalyst can enter the elutriation vessel 120 from the lift 460. Afterwards, the catalyst can pass through the pressure-reduction vessel 140, and then to the regeneration vessel 170 by gravity-assisted transfer. After the catalyst is regenerated, the catalyst may exit the regeneration vessel 170 via a line 470 to the lift 454. Afterwards, this cycle can be repeated.

Figure 3:
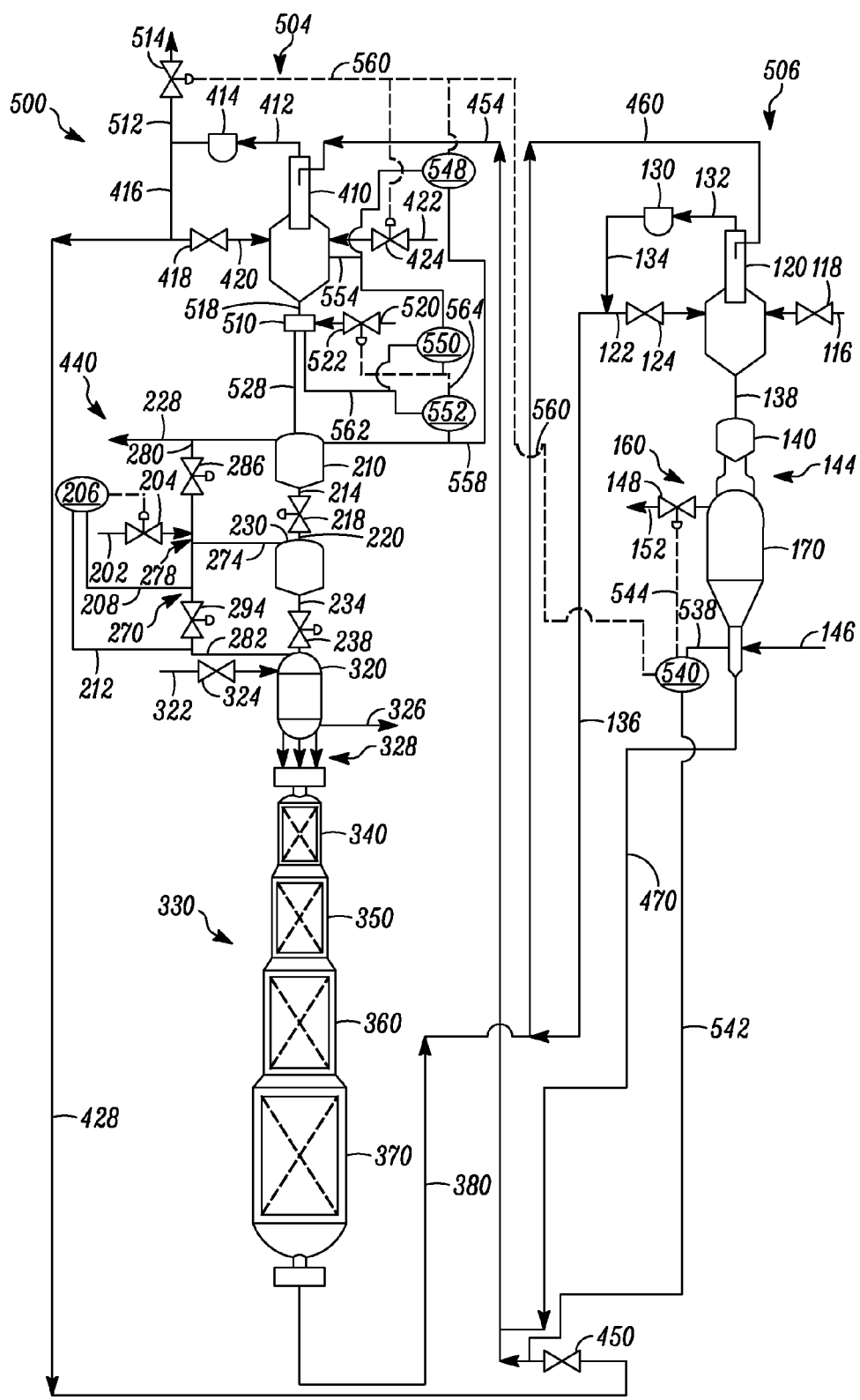
FIG. 3 is a schematic depiction of yet another exemplary hydrocarbon conversion unit.

Referring to FIG. 3, yet another exemplary embodiment of a hydrocarbon conversion unit is depicted. Generally, the hydrocarbon conversion unit 500 includes a first set 504 of substantially vertically-aligned vessels and a second set 506 of substantially vertically-aligned vessels. Generally, the first set 504 can include the elutriation vessel 410, a nitrogen-containing vessel 510, the apparatus 440, the reducing vessel 320, and the reactor 330 where the elutriation vessel 410, the apparatus 440, the reducing vessel 320, and the reactor 330 are substantially the same as described-above except where noted below. The second set 506 can include the elutriation vessel 120, the pressure-reduction vessel 140, and the regeneration vessel 170, as described-above. The lifts 454 and 460 can transfer catalyst back-and-forth between the sets 504 and 506, except that the lift 454 can utilize air instead of nitrogen as the lift gas.

Utilizing air can provide several benefits. One is that the pressure differential between the base of the regenerator 170 and the lift 454 can be 0 kPa (0 psi), which can minimize the length of piping required, and hence, the height of the set 506. As an example, the pressure in the regeneration vessel 170 can range from about 231 kPa(g) (about 33.5 psig)-about 265 kPa(g) (about 38.5 psig) and the pressure at the base of the lift can range from about 245 kPa(g) (about 35.5 psig)-about 265 kPa(g) (about 38.5 psig).

The hydrocarbon conversion unit 500 can also include differential pressure controllers 540, 548, 550, and 552. The differential pressure controller 540 can have pressure taps 538 and 542 communicating with, respectively, the base of the regeneration vessel 170 and the base of the lift 454. The differential pressure controller 540 can send a signal 544 to the control valve 148 and a signal 560 to control valves 424 and 514 for regulating the pressure differential between the base of the regeneration vessel 170 and the base of the lift 454.

In addition to the lift 454 containing air, the elutriation vessel 410 also may contain an atmosphere comprising predominately air instead of nitrogen. Consequently, a nitrogen bubble can be provided in the nitrogen-containing vessel 510, which can function similarly as the nitrogen-containing vessel 180 discussed above, and regulated by the differential pressure controllers 548, 550 and 552 to separate the atmospheres of the elutriation vessel 410 and the storage vessel 210.

In the elutriation vessel 410, air can be supplied via a line 422 through a control valve 424. Usually, the air removes dust from the regenerated catalyst and can escape through a line 412 into a dust collector 414. In the dust collector 414, dust can be removed from the air, which may then pass through a line 416. In this embodiment, air originating from the elutriation vessel 410 can go to one of three destinations. Part of the air can be recycled back to the elutriation vessel 410 through a line 420 by passing through a valve 418. Another part of the air passing through the line 416 can travel through a line 428 and pass through a valve 450 to supply the lift 454. Still yet another part of the air can be purged from the dust collector 414 by passing through a line 512 and through a control valve 514.

The nitrogen-containing vessel 510 can receive nitrogen through a line 520 passing through a control valve 522. Generally, the pressure in the nitrogen-containing vessel 510 is at a slightly higher pressure than the surrounding vessels 410 and 210 to prevent the mixing of atmospheres containing, respectively, air and hydrogen. As an example, if the pressure of the elutriation vessel 410 is about 245 kPa(g) (35.5 psig) and the pressure of the storage vessel 210 is about 241 kPa(g) (about 35.0 psig), the nitrogen-containing vessel 510 can have a pressure of about 248 kPa(g) (about 36.0 psig). Moreover, the nitrogen-containing vessel 510 can have a pressure differential of about 3 kPa (about 0.5 psi) with respect to the elutriation vessel 410 and a pressure differential of about 7 kPa (about 1 psi) with respect to the storage vessel 210.

To help maintain this higher pressure bubble, the differential pressure controllers 548, 550, and 552 can regulate the flow of air and nitrogen in the elutriation vessel 410 and the nitrogen-containing vessel 510. The differential pressure controller 548 can communicate with the elutriation vessel 410 and the storage vessel 210 via pressure taps 554 and 558 and send a signal 560 to control valves 424 and 514 to control, respectively, the flow of air into and out of the elutriation vessel 410. The differential pressure controller 550 may communicate via pressure taps 554 and 562 with, respectively, the elutriation vessel 410 and the nitrogen-containing vessel 510. The differential pressure controller 550 can send a signal 564 to the control valve 522 to regulate the flow of nitrogen into the nitrogen-containing vessel 510. The differential pressure controller 552 may communicate via pressure taps 562 and 558 with, respectively, the nitrogen-containing vessel 510 and the storage vessel 210, and provide a signal 564 to the control valve 522 for supplying nitrogen to the nitrogen-containing vessel 510. Desirably, the pressure bubble of nitrogen creates a nitrogen gas flow towards the vessels 210 and 410.

In operation, the catalyst can be transferred from the regeneration vessel 170 of the second set 506 to the elutriation vessel 410 of the first set 504 via a lift 454 utilizing air. Once in the elutriation vessel 410, catalyst can pass via gravity-assisted transfer through the line 518 to the nitrogen-containing vessel 510. The pressure in the nitrogen-containing vessel 510 should be high enough to separate the gases in the elutriation vessel 410 and the storage vessel 210 while not impeding the catalyst transfer by gravity-assisted transfer.

Subsequently, the catalyst by gravity-assisted transfer can pass through the apparatus 440, as described-above, and into the reducing vessel 320. Afterwards, the catalyst can pass through the reactor 330 by gravity-assisted transfer to convert hydrocarbons and exit via the line 380. Afterwards, the spent catalyst can be transported by a lift 460 utilizing nitrogen, similar to the lifts 310 and 314 described-above. Nitrogen can be supplied from the elutriation vessel 120, as described-above.

Afterwards, the catalyst can enter the elutriation vessel 120 of the second set 506. The catalyst can pass through the pressure-reduction vessel 140 and the regeneration vessel 170 via gravity-assisted transfer and exit via the line 470. The regenerated catalyst can repeat the cycle by entering the lift 454 with air, at least partially supplied by the line 428, as the lift gas.

Figure 4:
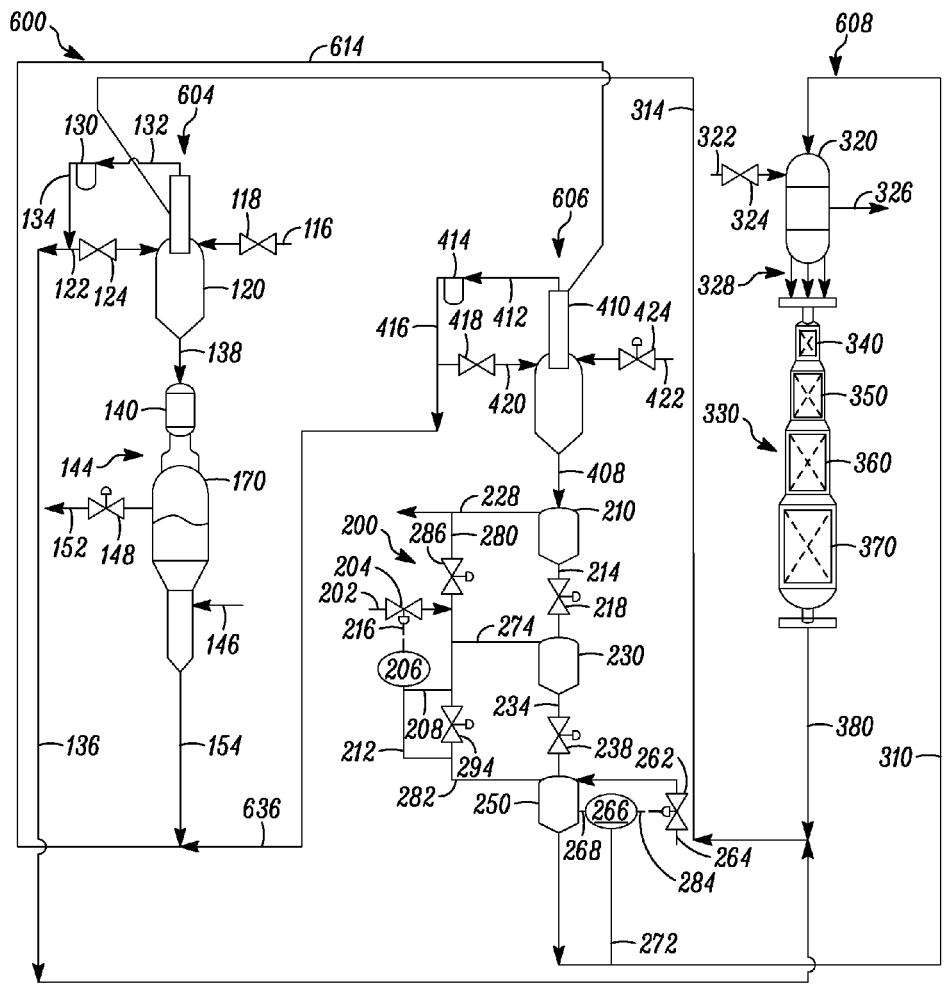
FIG. 4 is a schematic depiction of a further exemplary hydrocarbon conversion unit.

Referring to FIG. 4, still another an exemplary hydrocarbon conversion unit 600 can include a first set 604, a second 606, and a third set 608. Each set 604, 606, or 608 may include a plurality of vessels that are aligned substantially vertically. Particularly, the alignment of the vessels permits gravity-assisted transfer of catalyst from one to the next. Moreover, creating three sets of vessels can help to further reduce the overall height of the unit 600, and allow the use of greater pressure differentials between the oxygen and hydrogen environments to reduce the likelihood of unit shutdowns due to process upsets. Catalyst can be conveyed between the sets 604, 606, and 608 by lifts 310, 314, and 614, which utilize fluids comprising, respectively, hydrogen, nitrogen, and nitrogen and can provide a constant catalyst flow. Generally, these lifts 310, 314 and 614 have been described-above or are substantially similar to those described-above.

The first set 604 can include a first elutriation vessel 120, a pressure-reduction vessel 140, and a regeneration vessel 170, as described-above. The nitrogen gas from the elutriation vessel 120 can be utilized to transfer catalyst in the lift 314. In one exemplary embodiment, the pressure difference between the base of the regeneration vessel 170 and the base of the lift 614 can be about 14 kPa (about 2 psi). This increase in pressure differential from about 2 kPa (about 0.3 psi) can allow the unit 600 to operate with a greater tolerance for unit upsets.

The second set 606 can include the second elutriation vessel 410 and apparatus 200 as described-above. Generally, nitrogen is supplied to the elutriation vessel 410 through the line 422 and excess nitrogen can be supplied to the lift 614 via the line 636.

The third set 608 can include the reducing vessel 320 and the reactor 330, as described-above. Catalyst can pass from the reducing vessel 320 to the reactor 330 by gravity-assisted transfer.

In operation, beginning with the first set 604, spent catalyst passing from the lift 314 can enter the elutriation vessel 120. The catalyst can pass by gravity-assisted transfer from the elutriation vessel 120 into the pressure-reduction vessel 140, and afterwards into the regeneration vessel 170 by gravity-assisted transfer.

After exiting the regeneration vessel 170 via the line 154, the regenerated catalyst can enter the lift 614, at least partially supplied by nitrogen from the second elutriation vessel 410, to enter the second elutriation vessel 410 of the second set 606. The catalyst can pass from the elutriation vessel 410 to the apparatus 200 by gravity-assisted transfer. After exiting the receptacle vessel 250, the catalyst can enter the lift 310 supplied with hydrogen.

The catalyst may exit the lift 310 and enter the reducing vessel 320. Subsequently, the catalyst may exit the reducing vessel 320 by gravity-assisted transfer into the reactor 330. After converting a hydrocarbon stream, the spent catalyst may exit the reactor 330 through a line 380 and enter the lift 314 to repeat the circuit.

Optionally, one or more differential pressure controllers communicating with the storage vessel 210 and regeneration vessel 170 can be provided to provide a pressure differential of 7 kPa (1 psi) between the vessels 410 and 210 and a pressure differential of 14 kPa (2 psi) between the base of the lift 636 and the base of the regeneration vessel 170. In addition, the elutriation vessel 410 can have a pressure differential of 7 kPa (1 psi) with respect to the storage vessel 210 to aid the separation of the atmosphere of the reactor 330 from the lift 614.

Figure 5:
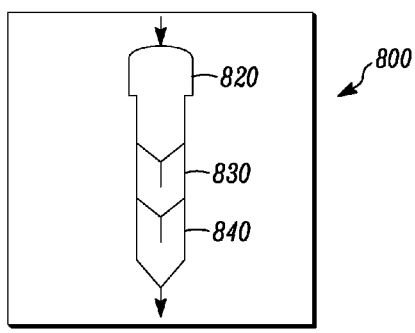
FIG. 5 is a schematic depiction of another exemplary apparatus for transferring catalyst.

Although transfer apparatuses 200 and 440 have been described-above, other transfer apparatuses can be utilized. As an example, instead of the apparatus 200, an exemplary apparatus 800, such as a valveless lock hopper 800, is depicted at FIG. 5 and can be utilized. The valveless lock hopper 800 can include a first chamber 820, a second chamber 830, and a third chamber 840. Lines can communicate with the valveless lock hopper 800 to permit passage of catalyst by gravity-assisted transfer. Particularly, catalyst can enter the first chamber 820 and proceed sequentially through the second chamber 830 and then the third chamber 840. Exemplary valveless lock hoppers are disclosed in U.S. Pat. No. 4,576,712 (Greenwood) and U.S. Pat. No. 4,872,969 (Sechrist).

Although not disclosed above, it should be understood that various safety devices, such as isolation valves, can be installed to prevent the mixing of gases containing oxygen and hydrogen. Furthermore, various pressure differentials have been described-above, it should be understood that any suitable differential can be utilized. As an example, a greater pressure differential can have the advantage of a unit having a greater tolerance for process upsets, but also may require greater lengths of piping as compared to a lesser pressure differential. What is more, the control schemes discussed above are merely exemplary and other suitable control mechanisms can be utilized to, e.g., effect a bubble of nitrogen at a greater pressure than surrounding vessels and/or lines. In addition, any suitable line or valve may be used, even though specific devices, e.g., control valves and vent lines, have been discussed above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An apparatus for transferring catalyst from a regeneration zone to a reaction zone in a hydrocarbon conversion unit, comprising:

a) a transfer vessel for transferring regenerated catalyst from the regeneration zone at a first pressure to the reaction zone at a second pressure wherein the second pressure is greater than the first pressure;
b) a first line communicating catalyst to the transfer vessel and coupled to a first valve to allow catalyst into the transfer vessel and a second line communicating catalyst from the transfer vessel and coupled to a second valve to allow catalyst out of the transfer vessel; and
c) a third line for allowing the passage of gas therethrough at a pressure higher than the first pressure having a first portion communicating with the transfer vessel and having a second portion coupled to third and fourth valves, wherein each of the third and fourth valves has a first position that is open and a second position that is closed, which corresponds, respectively, to the opening and closing of the first and second valves to allow gas to pass therethrough wherein the first portion of the third line is coupled to the second portion between the third and fourth valves and one end of the second portion communicates with a vent line from a storage vessel.

2. The apparatus according to claim 1, further comprising a storage vessel for storing regenerated catalyst and communicating with the transfer vessel, wherein the storage vessel releases stored catalyst.

3. The apparatus according to claim 2, wherein the storage vessel receives regenerated catalyst for subsequent release in batches to the transfer vessel.

4. The apparatus according to claim 1, further comprising:
a storage vessel for storing regenerated catalyst and releasing the stored catalyst to the transfer vessel in batches; and
a receptacle vessel for receiving regenerated catalyst by gravity-assisted transfer from the transfer vessel.

5. The apparatus according to claim 4, wherein
another end of the second portion communicates with the receptacle vessel for the transfer vessel.

6. The apparatus according to claim 5, wherein the third line communicates with the storage, transfer, and receptacle vessels and the third or fourth valve is opened to allow gas to pass if, respectively, the second or first valve in a closed position does not properly seal and allows gas to pass therethrough.

* * * * *